G. E. ANDERSON.
TOP FOR VEHICLES.
APPLICATION FILED NOV. 21, 1914.
1,163,632.
Patented Dec. 14, 1915.
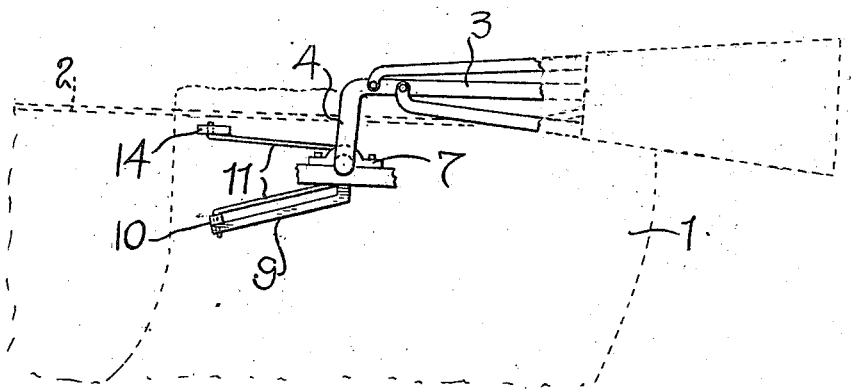
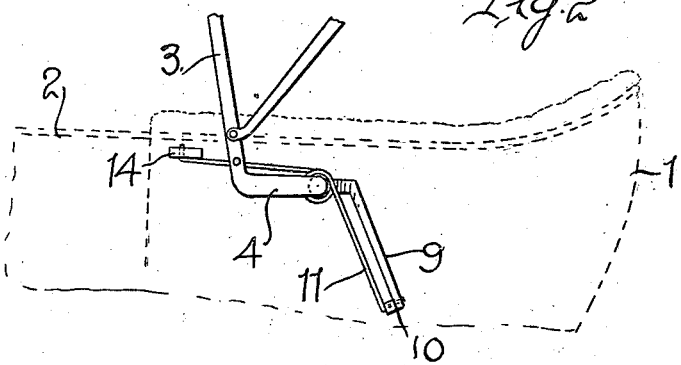
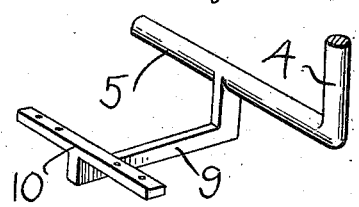
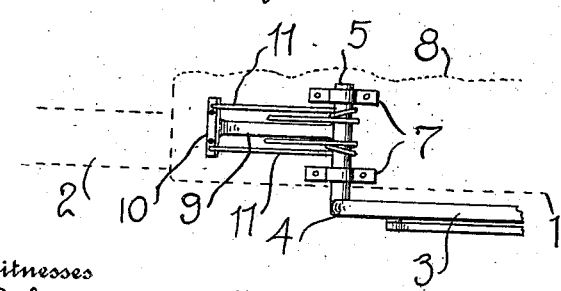
Inventor
G. E. ANDERSON
Witnesses
Robert M. Sutphen
A. J. Hind
By Watson E. Coleman
Attorney

UNITED STATES PATENT OFFICE.

GUSTAVUS E. ANDERSON, OF SOCORRO, NEW MEXICO.

TOP FOR VEHICLES.

1,163,632.  Specification of Letters Patent.  Patented Dec. 14, 1915.

Application filed November 21, 1914. Serial No. 873,380.

*To all whom it may concern:*

Be it known that I, GUSTAVUS E. ANDERSON, a citizen of the United States, residing at Socorro, in the county of Socorro and State of New Mexico, have invented certain new and useful Improvements in Tops for Vehicles, of which the following is a specification, reference being had to the accompanying drawings.

This invention relates to improvements in tops for vehicles, such as automobiles or the like; and an object of the invention is to provide a top of this general character which may be raised into operative position in substantially an automatic manner.

Furthermore, it is an object of the invention to provide a device of this general character having novel and improved means whereby the top may be raised with convenience and facility without necessitating the occupant of the vehicle, with which the top coacts, leaving the vehicle.

The invention consists in the details of construction and in the combination and arrangement of the several parts of my improved vehicle top whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a fragmentary view in side elevation illustrating a top constructed in accordance with an embodiment of my invention in applied position, the coacting vehicle being indicated by dotted lines and the top shown adjusted into a folded or inoperative position; Fig. 2 is a view similar to Fig. 1 but showing the top adjusted into operative position; Fig. 3 is a top plan view of the invention as disclosed in Fig. 1; and Fig. 4 is a fragmentary view, enlarged, illustrating certain details of the invention as herein set forth.

As disclosed in the accompanying drawings, 1 denotes the body of a vehicle, herein disclosed as a conventional type employed in connection with automobiles, having produced in each of its sides the entrance or door-way 2.

3 denotes the main bow of a foldable top, the opposite extremities of said bow being angularly disposed, as indicated at 4. Each of said angular portions 4 is provided at its free extremity with the inwardly disposed trunnion 5 adapted to be rotatably supported by the side of the body rearwardly of and in close proximity to an entrance or doorway 2. The trunnion 5 projects inwardly of the side and is supported by suitable bearings 7 and is adapted to have its inner portion concealed by the upholstery 8 of the car. Projecting forwardly from the trunnion 5 at a point intermediate the side wall and the upholstery is a rock arm 9 having affixed to its outer or free extremity a cross arm 10, to the opposite extremity of which are suitably secured the end portions of the springs 11, each of said springs having an intermediate portion coiled around the trunnion 5 with its opposite extremity secured to a cross bar 14 rigidly secured to the side wall of the body adjacent the upper edge thereof.

The tension of the springs 11 is such that when the main bow 3 is raised from its seat, which can be readily done by an occupant of the vehicle, the bow 3 will be automatically caused to assume its operative position, as it will be observed that the rock arm 9 will be forced downwardly under the influence of said springs.

From the foregoing description, it is thought to be obvious that a top for a vehicle constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

In combination with a body, a top therefor including a main bow, inwardly disposed trunnions carried by the extremities of the main bow and disposed through the adjacent sides of the body, a rock arm carried by each of the trunnions, a cross arm carried by the outer extremity of the rock arm, a stationary member carried by the wall of the body, and a spring positioned at opposite sides of the rock arm and having its opposite extremities secured to the cross arm of the rock arm and to the stationary support, the intermediate portion of said spring being coiled about the trunnion.

In testimony whereof I hereunto affix my signature in the presence of two witnesses.

GUSTAVUS E. ANDERSON.

Witnesses:
V. E. HANSON,
L. L. MAYER.